(No Model.) 2 Sheets—Sheet 1.

H. H. SATER.
WHEEL PLOW.

No. 396,606. Patented Jan. 22, 1889.

Witnesses:
E. N. Berry.
Frank L. Dyer,

Inventor,
Hans H. Sater
by Geo Wedger
Attorney.

(No Model.) 2 Sheets—Sheet 2.

H. H. SATER.
WHEEL PLOW.

No. 396,606. Patented Jan. 22, 1889.

Witnesses,
E. H. Berry.
Frank L. Dyer.

Inventor,
Hans H. Sater
by Geo. W. Dyer
Attorney.

UNITED STATES PATENT OFFICE.

HANS H. SATER, OF DUBUQUE, IOWA.

WHEEL-PLOW.

SPECIFICATION forming part of Letters Patent No. 396,606, dated January 22, 1889.

Application filed October 2, 1888. Serial No. 286,949. (No model.)

*To all whom it may concern:*

Be it known that I, HANS H. SATER, a citizen of the United States, residing at Dubuque, in the county of Dubuque and State of Iowa, have invented certain new and useful Improvements in Wheel-Plows; and I do hereby declare the following to be a full, clear, and exact description of the invention, which will enable others skilled in the art to which it appertains to make and use the same.

My invention relates to various new and useful improvements in wheel-plows, particularly to means for elevating and depressing the plow and plow-beam, so that these parts will always be balanced on the supporting-wheels, whether the furrow-wheel is below or in advance of the land-wheel, or whether both wheels are in the same plane.

My invention accordingly consists of a peculiarly-constructed axle to which the plow-beam is pivoted, and which acts in conjunction with a cam and a connecting-rod, and also with other mechanism, so that when the operating-lever is elevated the land-wheel is forced back and upwardly, the furrow-wheel is advanced, and the plow is lowered, so that the point enters the ground, and when the operating-lever is depressed the furrow and land wheels are brought back in the same plane and the plow is elevated, the various parts acting together in such a way that whether the plow is elevated or lowered in action or not it will always be nearly perfectly balanced on the supporting-wheels.

My invention also relates to a novel device acting in conjunction with the plow-beam, so that when in use and any small obstructions—such as stones, &c.—are encountered the plow will not partake of that oscillating "jerky" motion noticed in the plows heretofore used under similar circumstances, but will always remain perfectly steady; and the objects of my invention are to produce a plow composed of but comparatively few parts, one durable in use, effective in operation, and one in which the plow is always nearly balanced on the supporting-wheels, thus obviating any unnecessary strain. I attain these objects by the use of mechanism illustrated in the accompanying drawings, wherein like parts are represented by identical letters of reference in each view, and in which—

Figure 1:
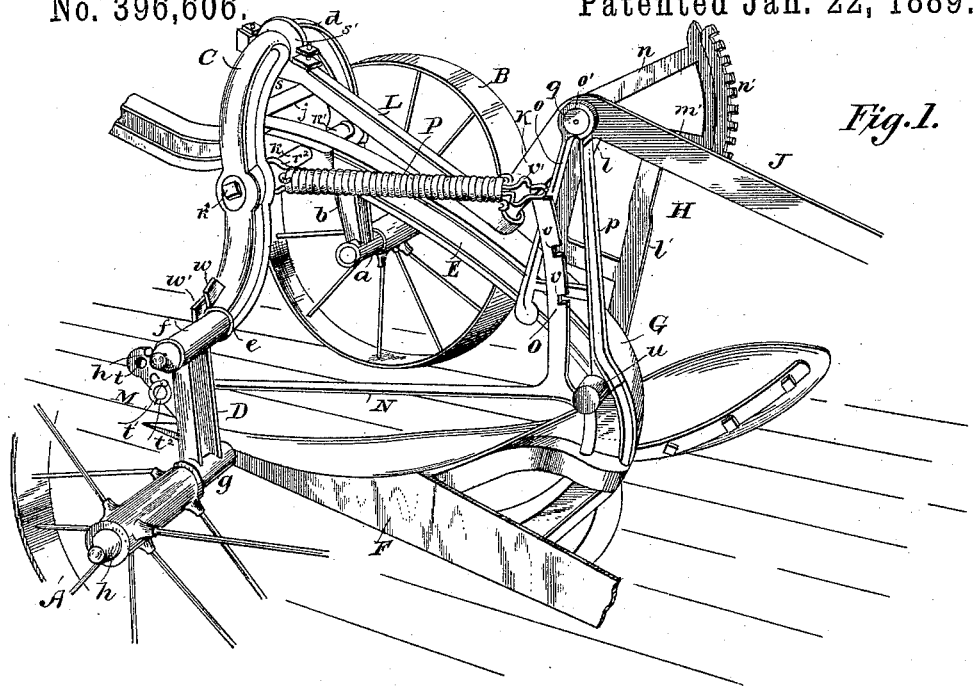
Figure 2:
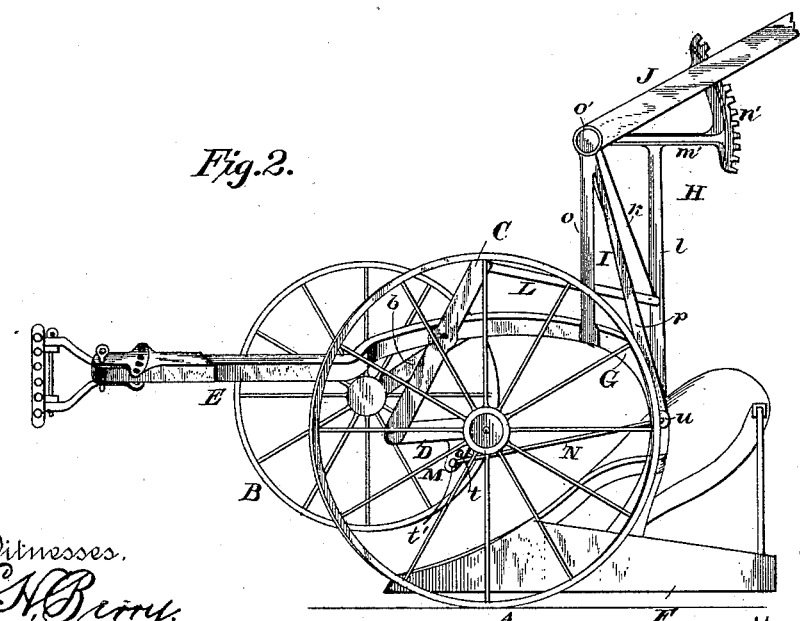
Figure 3:
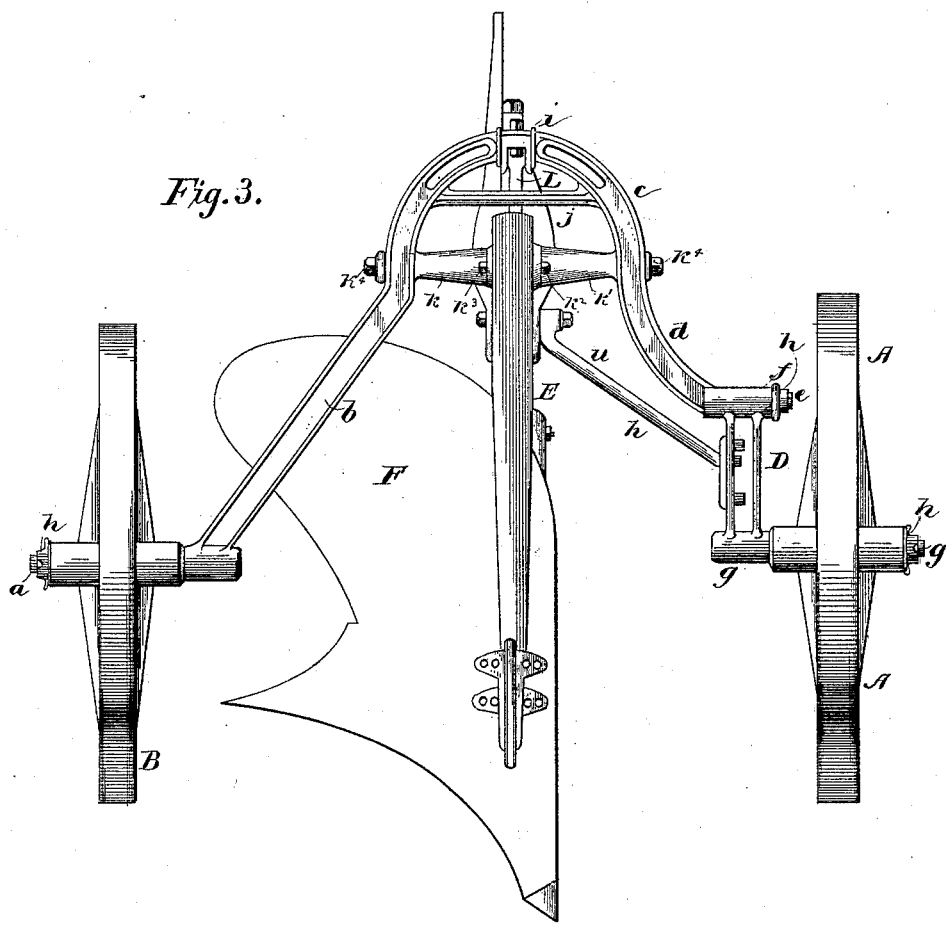
Figure 4:
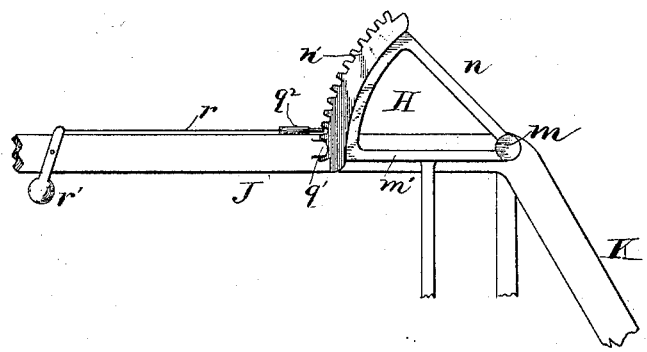

Figure 1 is a perspective view of the entire device, showing the plow as being elevated; Fig. 2, a similar view showing the plow as being lowered; Fig. 3, a front elevation of the same; Fig. 4, an elevation of the locking-segment and support for the operating-lever.

In the above views A represents the land-wheel—that is, the wheel which rides on the unplowed portion—and B the furrow-wheel. Both of these wheels are preferably the same size and may be of any well-known construction; but I prefer to make them entirely of metal, so as to insure great strength with but little weight. These wheels are mounted on an axle, C, of peculiar construction, made preferably of metal. This axle C is composed of the spindle or skein $a$ for the furrow-wheel, the long inclined portion $b$, the arched portion $c$, supporting the plow and plow-beams, the curved portion $d$, and the spindle $e$ in a horizontal plane somewhat above the spindle $a$. Encircling this spindle $e$ is the cylindrical portion $f$ of the swinging arm D, made of metal and provided at its lower end with the spindle or skein $g$, on which the land-wheel A rotates.

Suitable nuts, $h\ h\ h$, or other fastening devices, are attached to the ends of the spindles or skeins $a$, $e$, and $g$, to prevent the furrow-wheel B, swinging arm D, and land-wheel A, respectively, from becoming disengaged from said spindles. At the extreme upper part of the arch portion $c$ a bearing, $i$, is formed, for the purpose hereinafter explained.

Directly beneath the bearing $i$ and the bracing-rod $j$ the plow-beam E, supporting the plow F, is pivoted. The bearing at this point may be of any well-known construction; but I prefer to make use of the two cone-shaped pieces $k\ k'$, attached to each side of the plow-beam by means of nut and bolts $k^2\ k^3$, and passing through the lower portion of said arch $c$, and provided on their ends with nuts $k^4$, for the purpose of holding said cone-shaped portions securely in position. Instead of having the cone-shaped portions $k\ k'$ extending entirely through said arched portion $c$, they may extend only to the same, and in this case a bolt is passed through the inside of both of said cone-shaped portions, through the plow-beam, and through the arch, being provided on its outer end with suitable nuts. By the use of either of these two pivoting devices it will be seen that the plow-beam and plow may be oscillated, pendulum-like, beneath said arch.

At the curved portion G of the plow-beam E is pivoted a locking-segment, H, made preferably of metal, as is, indeed, most all the parts of the plow. This locking segment H is composed of the two vertical arms $l\ l$, both being attached to one side of the plow-beam, a bearing portion, $m$, at the top of the arm $l$, a horizontal arm, $m'$, connecting the bearing portion $m$ of the arm $l$ with the upper end of the arm $l'$ and extending out some distance beyond the latter, an arm, $n$, extending obliquely up from said bearing portion $m$, and a curved rack, $n'$, connecting the outer ends of the arms $m'$ and $n$. On the other side of the plow-beam, directly opposite the locking-segment H, is a supporting-bracket I, composed of the vertical arm $o$, of the exact length of the arm $l$, and provided at its upper end with the bearing $o'$ on an exact line with the bearing portion $m$, and an oblique arm, $p$, extending down from said bearing $o'$ and attached to the plow-beam. Pivoted on a horizontal bolt, $q$, extending from the bearing $m$ to the bearing $o'$, is a lever, J, provided with a perpendicular shorter arm, K. This lever J is provided with a lug, $q'$, extending over the curved rack $n'$, and with a spring-latch, $q''$, of any well-known construction, engaging with the teeth of said rack. A wire or rod, $r$, connects the said latch with the small hand-lever $r'$, located near the upper end of the lever J, and by means of which the said latch may be operated and withdrawn from the end of said lever.

Connecting the bearing $i$ with the lower end of the arm K of the lever J is a rod, L, provided at its forward end with an enlarged portion, $s$, having a semicircular opening therein engaging under said bearing $i$, and with a locking-block, $s'$, also provided with a semicircular opening therein engaging over said bearing-piece $i$ and attached to said connecting-rod L by means of bolts and nuts, as shown. By this means it will be seen that the connecting-rod L may be disengaged from the bearing $i$ by simply removing the locking-block $s'$.

On the swinging arm D a cam, M, is secured, made substantially of the form shown, and provided along its outer edge with a series of openings or holes, $t\ t\ t$. A connecting-rod, N, is provided with a circular lug, $t'$, thereon adapted to be inserted in one of said openings or holes $t\ t\ t$, and on the outside of said circular lug $t'$ a split pin, $t''$, is adapted to be introduced for the purpose of locking said lug securely in place. The other end of this rod N is preferably attached to the bolt $u$, which holds the lower end of the oblique arm $p$ in position on the plow-beam. At a point on said rod N, near the point of connection with said bolt $u$, a rigid arm, O, extends nearly vertically upward for some distance, and is provided on its rear edge with a series of notches, $v\ v$, in one of which the link $v'$ of the spring P engages. The other end of this spring P is provided with another link, $v''$, encircling the cone-shaped piece $k$ and tending to exert a constant pressure of the vertical arm O toward the arch $c$.

On the extreme lower portion of the axle C, directly above the spindle $e$, is a lug or projection, $w$, and on the cylindrical portion $f$ of the swinging arm D is a similar projection, $w'$, so that when said swinging arm is directly vertical these two projections abut against each other, and said swinging arm is prevented from any further movement toward the front of the plow.

By means of the openings or holes $t\ t\ t\ t$ in the cam M the length of the rod N from the plow-beam can be conveniently adjusted and the elevation of the land-wheel thereby easily regulated.

The operation of the whole device, supposing the plow and plow-beams to be elevated, is as follows: The small hand-lever $r'$ is first forced backward, carrying the connecting rod or wire $r$ with it and disengaging the latch $q''$ from the rack $n'$ of the locking-segment H. The operating-lever J is now elevated and carries the arm K in substantially a horizontal direction. The connecting-rod L, being attached to said arm K, moves therewith and forces the upper part of the arch $c$ backwardly, which turns as on a pivot and on the conical pieces $k\ k'$. The lower end of the axle will of course be forced in an opposite direction—that is, toward the front of the plow—and carries the spindles or skeins $a$ and $e$ with them and the furrow-wheel B. The land-wheel will not be advanced, but, on the contrary, will be elevated and forced backward, by reason of the rod N opposing the forward motion of the spindle or skein $e$. It will now be seen that the elevation of the wheels A and B is practically the same as a depression of the plow, which is at liberty to enter the ground, and it will also be seen that the elevation of the land-wheel will place this wheel in a higher plane than the furrow-wheel, as has been always done; but that the motion forward of the furrow-wheel and the motion backward of the land-wheel are practically equal, so that the plow will be nearly balanced under the arch $c$, whether in ground or out.

When the plow is to be elevated, the operating-lever J is depressed, all the motions just described being reversed, and the two wheels A and B are brought forward and back, so as to be in the same horizontal and vertical plane. When the swinging arm B is thus vertical, the two lugs $w\ w'$ abut against each other and any further motion of the arm is prevented.

When the plow is in use, should either wheel come into contact with any obstruction—for instance, a stone—without the spring P, and the arch $c$, the plow and beam might begin to oscillate; but by means of this spring any such motion is prevented by reason of the constant tendency of the spring to force this arch backwardly.

Many of the parts above described may be varied somewhat in form; but such changes would require merely the exercise of mechanical skill, and not the application of inventive ingenuity.

Having now described my invention, what I claim as new therein, and desire to secure by Letters Patent, is—

1. A sulky-plow having an axle, C, a plow pivotally suspended beneath the same, a furrow-wheel, B, at one end of said axle, a swinging arm, D, at the other end of said axle, a land-wheel, A, at the lower end of said swinging arm D, and a rod, N, connecting said arm with the plow-beam, substantially as set forth.

2. A sulky-plow having an axle, C, a plow pivotally suspended beneath the same, a furrow-wheel, B, at one end of said axle, a swinging arm, D, at the other end of said axle, the land-wheel A at the lower end of said swinging arm, a cam, M, rigidly secured to said swinging arm, and a connecting-rod, N, connecting said cam with the plow-beam, substantially as set forth.

3. A sulky-plow having an axle, C, a plow pivotally suspended beneath the same, a furrow-wheel, B, at one end of said axle, swinging arm D at the other end of said axle, a land-wheel, A, at the lower end of said swinging arm, a cam, M, rigidly secured to said swinging arm D and provided with a series of openings or holes, $t\ t\ t\ t$, and a rod, N, provided with a cylindrical lug thereon and connecting said cam with the plow-beam, substantially as set forth.

4. A sulky-plow having an axle, C, a plow pivotally suspended beneath the same, a furrow-wheel, B, at one end of said axle, a swinging arm, D, at the other end of said axle, a land-wheel, A, at the lower end of said swinging arm D, a rod, N, connecting said swinging arm with the plow-beam, and a lever, J, pivoted above said plow-beam and connected with the upper end of said axle, substantially as and for the purposes set forth.

5. A sulky-plow having an axle, C, a plow pivotally suspended beneath the same, a furrow-wheel at one end of said axle, a swinging arm, D, at the other end of same, a land-wheel, A, at the lower end of said swinging arm, a rod, N, connecting said swinging arm with the plow-beam, a lever, J, pivoted above said plow-beam and connected with said axle, and the curved rack $n'$ at one side of said lever, for the purpose set forth, substantially as described.

6. A sulky-plow having an axle, C, a plow pivotally suspended beneath the same, a furrow-wheel, B, on one end of said axle, a swinging arm, D, at the other end of the same, a land-wheel, A, at the lower end of said swinging arm, a rod, N, connecting said swinging arm with the plow-beam, a lever, J, pivoted above said plow-beam and connected with the upper part of said axle, a segment, H, on one side of said lever J, and a supporting-bracket, I, on the other side, substantially as set forth.

7. A sulky-plow having an axle, C, a plow pivotally suspended beneath the same, a furrow-wheel, B, on one end of said axle, a swinging arm, D, at the other end of said axle, a land-wheel, A, at the lower end of said swinging arm, a rod, N, connecting said swinging arm D with the plow-beam, a rod, O, extending upward from the rod N, and a spring, P, connecting said rod O with the axle C, substantially as set forth.

8. A sulky-plow having an axle, C, a plow pivotally suspended beneath the same, a furrow-wheel, B, on one end of said axle, a swinging arm, D, on the other end of the same, a land-wheel, A, on the lower end of said swinging arm, a lug, $w$, on the lower end of said axle, and a similar lug, $w'$, on the upper portion of said swinging arm, substantially as set forth.

In testimony whereof I affix my signature in presence of two witnesses.

HANS H. SATER.

Witnesses:
MONROE M. CADY,
ED. W. DUNCAN.